United States Patent [19]

Soupal

[11] 4,072,085
[45] Feb. 7, 1978

[54] COMBINED HYDRAULIC AND VACUUM BOOSTER

[75] Inventor: Thomas R. Soupal, Owosso, Mich.

[73] Assignee: Midland-Ross Corporation, Cleveland, Ohio

[21] Appl. No.: 617,199

[22] Filed: Sept. 26, 1975

[51] Int. Cl.² .................. F15B 11/20; F15B 13/07
[52] U.S. Cl. .......................... 91/413; 60/548; 60/560; 60/563; 91/369 B
[58] Field of Search ............. 91/369 B, 413, 411 A; 60/548, 563, 560

[56] References Cited

U.S. PATENT DOCUMENTS

| | | | |
|---|---|---|---|
| 825,866 | 7/1906 | Rogers | 91/411 A |
| 3,295,420 | 1/1967 | Gleason | 91/413 X |
| 3,628,422 | 12/1971 | Acre | 91/376 |
| 3,691,903 | 9/1972 | Shellhause | 91/376 R |
| 3,935,709 | 2/1976 | Mathues et al. | 91/369 B |

Primary Examiner—Irwin C. Cohen
Attorney, Agent, or Firm—H. Duane Switzer

[57] ABSTRACT

A combined hydraulic and vacuum booster includes hydraulic and vacuum boosters coaxially mounted in series and having a common force output member. The combined booster includes common operating means for energizing the boosters in sequence for first applying substantially the full force of the hydraulic booster to the output member while the vacuum booster is substantially inoperative, and then applying the force of the vacuum booster to the output member.

5 Claims, 2 Drawing Figures

COMBINED HYDRAULIC AND VACUUM BOOSTER

BACKGROND OF THE INVENTION

This applications pertains to the art of boosters and, more particularly, to booster of the type commonly used in power braking systems for vehicles. Although the invention is particularly applicable for use in power brake systems for vehicles, and will be specifically described with reference thereto, it will be appreciated that the invention has broader aspects and the booster may be used in other environments.

Hydraulic boosters, vacuum boosters and combinations thereof are very well-known. Modern automobiles frequently have insufficient engine vacuum available for operating a vacuum booster to develop adequate force to properly operate the vehicle brakes. Hydraulic boosters alone are capable of developing adequate force but become more expensive with larger sizes and larger pump capacities. It is also desirable to have a dual system for providing at least partial power boost in the event of a failure in one system. Therefore, hydraulic and vacuum boosters have been combined by coaxially mounting hydraulic and vacuum boosters in series with a common force output member.

In combined hydraulic and vacuum boosters of the type described, the operating valves are arranged so that the vacuum booster is first operated for applying substantially its full force capability before the hydraulic booster is energized. When a combined booster of this type is used in a hydraulically actuated wheel lock control system or the like, there is insufficient hydraulic pressure available from the hydraulic booster to operate the wheel lock control system at low braking force applications because only the vaccum booster is energized. This means that an expensive additional control valve and actuator must be provided for developing sufficient hydraulic pressure to the wheel lock control system when only the vacuum booster is energized.

SUMMARY OF THE INVENTION

A combined hydraulic and vacuum booster includes hydraulic and vacuum, boosters coaxially mounted in series and having a common force output member. Common operating means energizes the boosters in sequence for first applying substantially the full force of the hydraulic booster to the output member while the vacuum booster is substantially inoperative, and then applying the force of the vacuum, booster to the output member.

In a preferred arrangement, the hydraulic and vacuum boosters respectively include hydraulic and vacuum booster operating valves. The operative means comprise a common operating member for the valves and is operative to first operate the hydraulic booster valve for energizing the hydraulic booster, and subsequently operating the vacuum booster valve for energizing the vacuum booster.

In the preferred construction, the hydraulic booster includes a piston and a normally open hydraulic valve for bypassing hydraulic fluid from one side to the other of the piston. The operating means is operative to first close the hydraulic valve and then momentarily energize the vacuum booster with substantially less than its full force potential so that the vacuum booster simply follows the hydraulic booster without supplying any significant force to the force output member until substantially the full force of the hydraulic booster is applied to the force output member, whereupon the vacuum booster is energized to substantially its full force potential.

The booster is advantageously installed in a wheel lock control unit for a vehicle braking system, and the wheel lock control unit is connected for communication with inlet and outlet ports for the hydraulic booster. Whenever the booster is energized, the hydraulic booster is energized first so that the hydraulic pressure is supplied to the wheel lock control unit even at low braking force applications. A wheel lock control unit in which the improved booster of this application can be used is disclosed in U.S. Pat. No. 3,810,680 issued May 14, 1974, to Schenk.

It is a principal object of the present invention to provide an improved combined hydraulic and vacuum booster.

It is a further object of the invention to provide such a combined booster wherein the vacuum booster is momentarily energized to substantially less than its full force potential so that it simply follows the hydraulic booster until substantially the full force of the hydraulic booster is realized.

It is an additional object of the invention to provide such a combined booster which is very reliable in operation, and relatively simple to manufacture and assemble.

DESCRIPTION OF A PREFERRED EMBODIMENT

Figure 1:
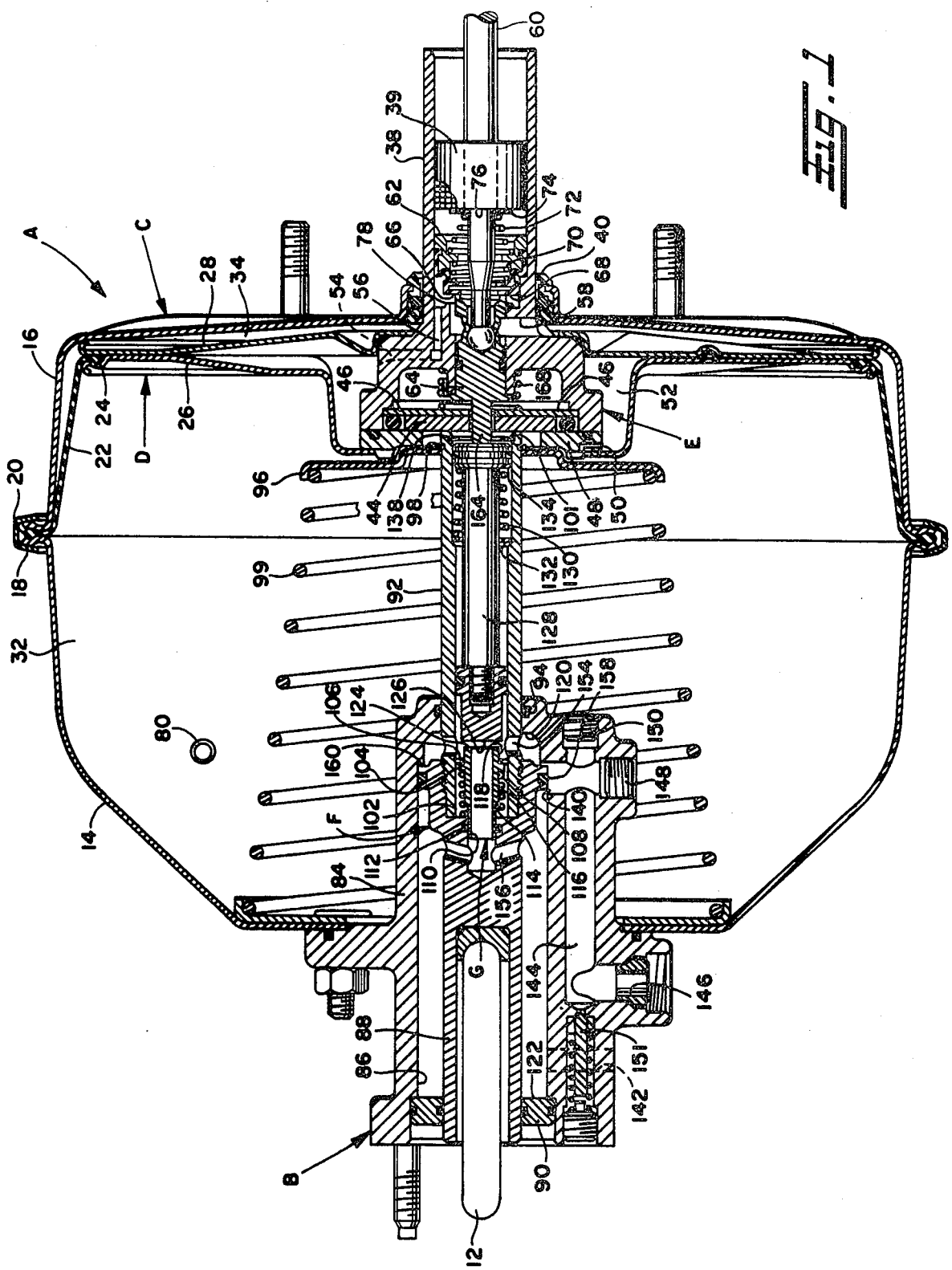
FIG. 1 is a cross-sectional elevational view of a combined hydraulic and vacuum booster constructed in accordance with the present invention.

With reference to the drawing, FIG. 1 shows a combined hydraulic and vacuum booster A which includes a hydraulic booster B and a vacuum booster C coaxially mounted in series with one another and having a common force output member 12.

Vacuum booster C is of a known type as described by way of example in U.S. Pat. No. 3,628,422 issued Dec. 21, 1971, to Acre. Vacuum booster C includes housing parts 14 and 16 secured together as by clamping band 18 and gripping a circumferential outer bead 20 of a flexible diaphragm 22 having a circumferential inner bead 24 clamped between diaphragm plates 26 and 28 which are suitably secured together as by spot welding or the like. Diaphragm 22, and plates 26 and 28, cooperate to define a movable diaphragm generally indicated by letter D. First and second chambers 32 and 34 are defined on opposite sides of diaphragm D within housing parts 14 and 16.

A hub member E is mounted between the longitudinally spaced-apart inner end portions of diaphragm plates 26 and 28, and includes an elongated cylindrical sleeve portion 38 extending through a suitable seal 40 in housing part 16. The interior of sleeve portion 38 is open to atmosphere through a filter 39.

Hub member E has a forward cavity receiving a rectangular bridge member 44 and a pair of rectangular levers 46 retained in the cavity by a cover member 48. Passages generally indicated at 50 provide communication between chamber 32 and an annular cavity 52 surrounding hub member E between the inner end portions of diaphragm plates 26 and 28. A generally radial passage 54 in hub member E provides communication between annular cavity 52 and an axial passage 56 communicating with the interior of sleeve 38. Another generally radially extending passage 58 provides communication of chamber 34 with either chamber 32 or atmosphere depending upon the position of a valve.

Operating means for energizing booster A includes an elongated reciprocable rod 60 extending through filter 39 which is press fit or otherwise secured within sleeve portion 38 against axial movement relative thereto. Rod 60 extends through a member 62 which is also press fit or otherwise secured within sleeve portion 38 against axial movement relative thereto. Operating rod 60 is suitable secured to a member 64 having a seat 66 for cooperation with a bellows-like valve member 68 secured to member 62 and normally biased to the left in FIG. 1 by a coil spring 70. Another coil spring 72 acts between member 62 and a washer 74 bearing against shoulder 76 on rod 60. Member 64 is slidable in a bore having a seat 78.

Chamber 32 is normally connected to a source of vacuum as generally indicated at 80. In the position of the parts shown in FIG. 1, chamber 32 is in communication with chamber 34 through passages 50, annular cavity 52, passage 54, passage 56, past seat 78 and through passage 58. When operating rod 60 is moved to the left in FIG. 1, valve member 68 will contact seat 78 for blocking communication between chambers 32 and 34 because passage 56 can no longer communicate past seat 78 with passage 58. Slight further movement of rod 60 to the left will move seat 66 on member 64 away from valve 68 so that atmospheric pressure communicates through sleeve portion 38 past central openings in member 62 and valve 68, then past seat 66 with passage 58 for exposing chamber 34 to atmospheric pressure for moving diaphragm D to the left.

Hydraulic booster B includes a housing 84 suitable secured to housing part 14 and having a cylindrical bore 86. A piston F reciprocatingly mounted within bore 86 has an extended portion 88 guided through a fixed seal 90 in bore 86 and carries force output member 12 which is connected in a known manner for operating a master cylinder to operate the vehicle brakes.

A guide sleeve 92 secured to piston F slidably extends through a suitable seal 94 in hydraulic booster housing 84. A disc 96 positioned on sleeve 92 acts against a snap ring 98 on sleeve 92 under force supplied by coil spring 99 for normally shifting piston F and diaphragm D to the positions shown in FIG. 1. End 101 of sleeve 92 bears against bridge member 44 in hub E.

Sleeve 92 has a hollow portion 102 within piston F reciprocatingly receiving a valve sleeve G having an outwardly extending circumferential shoulder 104 normally biased against an inwardly extending circumferential shoulder 106 on sleeve 92 by a spring 108. Valve sleeve G has a small diameter end portion 110 slidable relative to a seal 112 and an outwardly stepped portion 114 within cavity 102 forming a larger diameter portion 116. The other end portion 118 of valve sleeve G on the opposite side of shoulder 104 has a still larger diameter than portion 116. With this arrangement, valve sleeve G has a smaller external area facing generally toward one end 120 of cylinder B than toward other end 122 thereof. Valve sleeve G has a circumferential inwardly inclined seat 124 for cooperation with a flat end 126 on piston rod 128 which is normally biased to the right in FIG. 1 by a coil spring 130 acting on a snap ring 132 positioned within sleeve 92 and against a shoulder 134 on piston rod 128. A snap ring 138 positioned within sleeve 92 adjacent end 101 thereof prevents displacement of piston rod 128 from within sleeve 92.

An inlet port 140 communicates with cylinder bore 86 adjacent one end 120 thereof and an outlet port 142 communicates therewith adjacent other end 122 thereof. A passage 144 provides communication between inlet port 140 and another port 146 which is connected to a hydraulic pump. Plugs 148 and 150 are provided in housing 84 to close the openings formed by drilling inlet port 140 and passage 144. A pressure relief valve 151 is provided communicating between passage 144 and outlet port 142. Sleeve 92 has lateral ports as at 154 to establish communication from one side of piston F to the other side thereof through valve sleeve G and lateral ports 156 in piston extension portion 88. Piston F has a cast iron sealing ring 158 positioned within a circumferential groove therein and engaging the wall of cylinder bore 86. The axial length of piston F engaging the wall of cylinder bore 86 is less than the diameter of inlet port 140, and piston F is normally maintained in the position shown against a shoulder 160 in bore 86 with inlet port 140 open to cylinder bore 86 on both sides of piston F.

Member 64 within hub E has an extension 164 extending through a suitable hole in bridge member 44 and enagaging piston rod 128. A coil spring 168 acts between hub E and reaction levers 46 for normally maintaining such levers flat against bridge member 44 as shown in FIG. 1.

Hydraulic piston F normally occupies a passive position adjacent one end 120 of cylinder B and is movable toward other end 122 thereof to working positions. With a hydraulic pump operating for supplying hydraulic fluid through inlet port 140, the hydraulic fluid flowing into bore 86 on one side of piston F is simply returned to reservoir through outlet port 142. The hydraulic fluid flowing through inlet port 140 to the right hand side of piston F flows through ports 154, past seat 124, through valve sleeve G, through ports 156 and into cylinder bore 86 on the left hand side of piston F for return to reservoir through outlet port 142.

In the preferred arrangement, the distance between seat 124 on valve sleeve G and flat end 126 of piston rod 128 is somewhat less than the distance between member 64 and reaction levers 46, and between valve 68 and seat 78. When the brakes are operated, rod 60 moves to the left in FIG. 1 so that valve 68 moves under the influence of spring 70 toward seat 78 and member 64 moves toward reaction levers 46. At the same time, extension 164 on member 64 acts against piston rod 128 for moving same to the left until flat end 126 engages seat 124 to close the interior of valve sleeve G against flow of hydraulic fluid therethrough. At this time, piston F will still not move because there will be substantially no pressure build up on the right hand side of piston F due to the fact that inlet port 140 is freely open to reservoir on the opposite side of piston F. Further movement of operating rod 60 will cause valve 68 to engage seat 78 and seat 66 will move away from valve 68 for closing chamber 34 against communication with the vacuum in chamber 32 and opening chamber 34 to communication with atmospheric pressure through hollow sleeve 38. Diaphragm D will then begin moving to the left in FIG. 1 and bridge member 44 acts against end 101 of sleeve 92 for moving piston F to the left unitl it is past inlet port 140. During this operation, which occurs very rapidly, chamber 34 is only open to atmosphere momentarily so that vacuum booster C is energized to substantially less than its full force potential. As soon as piston F is in a position wherein inlet port 140 is substantially completely on the right hand side of piston F, hydraulic pressure will begin moving piston F to the left. Diaphragm D and hub E will follow sleeve 92 due to the partial pressurization within chamber 34, and this movement of hub E will overtake the movement of operating rod 60 and member 64 until valve 68 is seated against both of seats 66 and 78 so that the vacuum booster valve is in a lapped position wherein chamber 34 is not communicating with atmosphere or with chamber 32, and is only partially pressurized to a pressure substantially less than atmospheric. During operation of hydraulic piston F, the vacuum valve will normally remain in this lapped position until the full force of hydraulic booster B is being applied, or until additional braking force is necessary, whereupon further movement to the left of operating rod 60 again causes member 64 to move relative to hub E so that seat 66 moves away from valve 68 and again opens chamber 34 to atmospheric pressure so that vacuum booster C is energized to substantially its full force potential.

The overtravel provided for valve sleeve G prevents extremely large forces from being applied through flat end 126 of piston rod 128 against seat 124, and allows sufficient movement of piston rod 128 after seating against seat 124 to partially operate vacuum booster C. Once piston F is moved to the left past inlet port 149, hydraulic fluid leaks past valve sleeve end portion 118, and shoulders 104 and 106 into cavity 102. This hydraulic pressure acting on stepped portion 114 and the left hand side of shoulder 104 is greater than the pressure acting against the right hand side of shoulder 104 so that the hydraulic pressure biases valve sleeve G to the right during operation of hydraulic booster B aiding spring 108 in firmly holding seat 124 in engagement with shoulder 106.

The arrangement described for initiating operation of hydraulic booster B by first momentarily energizing vacuum booster C to substantially less than its full force potential is a preferred arrangement. However, it will be recognized that it is possible to move piston F completely to the left of inlet port 140 only through force applied by operating rod 60, or to initially locate piston F completely to the left of inlet port 140 with all of the hydraulic fluid flow normally traveling through valve sleeve G until flat end 126 of piston rod 128 seats against seat 124. In cold weather operation, the hydraulic fluid has a greater viscosity and this can create problems if piston F is located completely to the left of inlet port 140 in its passive position because valve sleeve G would have to be much larger to handle all of the flow. Making such valve larger affords very poor controllability and the valve will oscillate so good modulation is not possible. The cold flow problem advises one to make the valve sleeve larger, while the oscillation problem tells one to make the valve sleeve smaller. The arrangement for locating piston F in its passive position so that hydraulic fluid flows through inlet port 140 on both sides thereof solves the cold flow and oscillation problems. However, it is possible to provide a larger valve sleeve with other compensating arrangements to minimize oscillation, while locating piston F in its passive position completely to the left of inlet port 140.

In the arrangement shown and described, valve sleeve G and its seat 124 cooperate with flat end 126 of piston rod 128 to generally define a hydraulic booster operating valve. Valve member 68, and seats 66 and 78 generally define a vacuum booster operating valve. Such valves are operated by a common operating means generally defined by operating rod 60. This operating means is operative to energize the hydraulic and vacuum boosters in sequence for first applying substantially the full force of the hydraulic booster and then applying the force of the vacuum booster. This is accomplished by first operating the hydraulic booster valve for energizing the hydraulic booster and subsequently operating the vacuum booster valve for energizing the vacuum booster. In the preferred arrangement as described, the hydraulic valve is normally open for bypassing hydraulic fluid through valve sleeve G from one side to the other of piston F. The operating means first closes the hydraulic valve and them momentarily enegizes the vacuum booster C with substantially less than its full force potential so that vacuum booster diaphragm D simply follows the hydraulic booster without supplying any significant force to force output member 12 until substantially the full force of hydraulic booster B is applied to force output member 12, whereupon vacuum booster C is energized to substantially its full force potential by opening of its valve.

As previously explained, valve sleeve G is mounted for axial movement relative to piston F and is normally biased in one direction toward piston rod 128 by yieldable biasing means defined by spring 108. Valve sleeve G is yieldable in an opposite direction to the left in FIG. 1 when piston rod end 126 engages seat 124 in order to accommodate overtravel of piston rod 128. It has been found highly desirable to use a cast iron piston ring 158 because an elastomeric ring may be displaced or damaged as it moves past inlet port 140.

Sleeve 92 may be considered as being a part of piston F, with the internal opening through shoulder 106 and the opening past seal 112 defining a bore in piston F. With the bore so defined, the intermediate portion of such bore is enlarged to define cavity 102 surrounding the valve sleeve member G. With the diameters of valve sleeve G arranged as previously described, such valve sleeve member has a larger external area within cavity 102 facing generally toward other cylinder end 122 than toward one cylinder end 120. Leakage path means is provided past the exterior of sleeve end portion 118 and shoulder 106 into cavity 102 for pressurizing cavity 102 in one direction toward one cylinder end 120 with a force proportional to the pressure acting on piston F.

Figure 2:
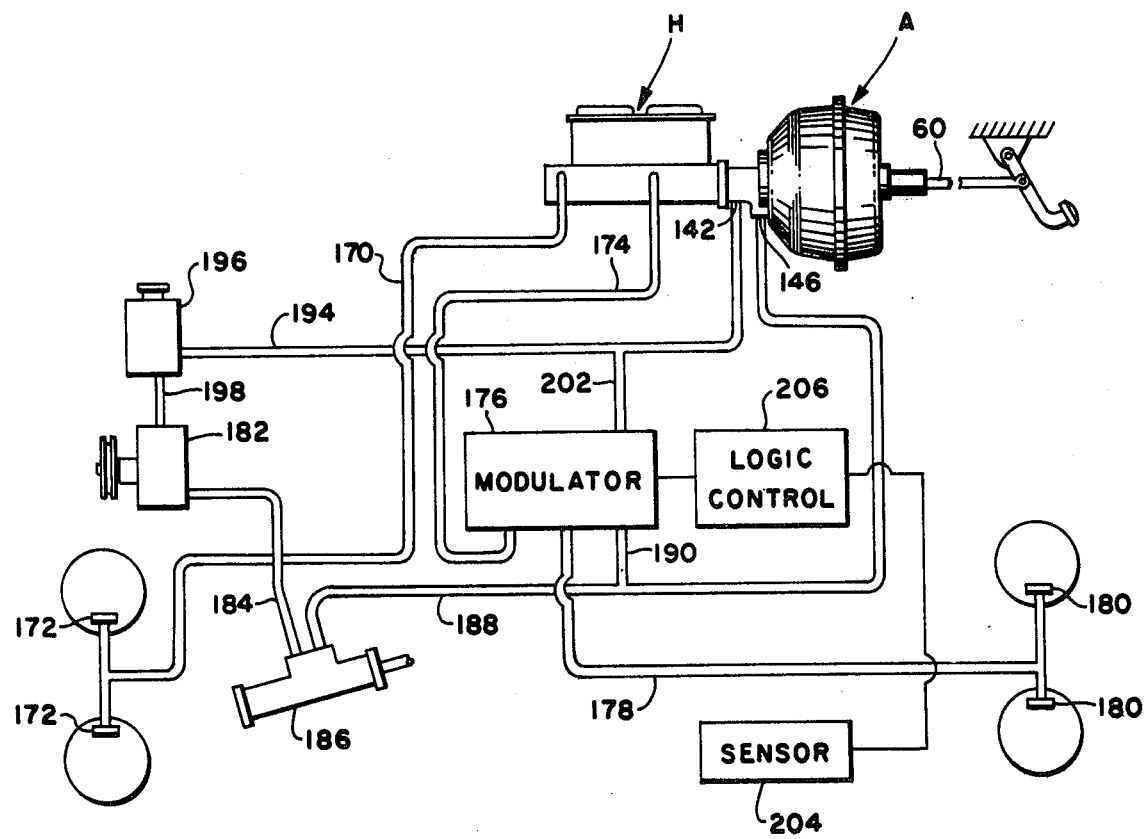
FIG. 2 is a diagrammatic illustration of a wheel lock control system having the improved booster of the present invention incorporated therein.

FIG. 2 schematically shows the improved combined hydraulic and vacuum booster of the present application incorporated in a wheel lock control system. Combined booster A is connected with a master cylinder H having a conduit 170 connected with front wheel brakes 172, and a conduit 174 connected through modulator 176 and conduit 178 with rear wheel vehicle brakes 180. Hydraulic pump 182 supplies hydraulic fluid through conduit 184 to power steering unit 186 and then through conduit 188 to inlet 146 of booster A. A branch line 190 connects conduit 188 with modulator 176. A return conduit 194 connected with booster outlet port 142 communicates with reservoir 196 connected with pump 182 by conduit 198. A branch conduit 202 connects return conduit 194 with modulator 176. Sensor 204 and logic control 206 are connected with modulator 176. As is well known, sensor 204 may sense incipient wheel lock of the rear wheels and send appropriate signals through logic control 206 for generating wheel lock control signals for modulator 176. The signal actuates modulator 176 to cause a decrease of brake apply pressure at the rear vehicle wheel brakes so the rear wheels are permitted to roll within a desirable range of percent wheel slip instead of locking.

In previous arrangements of the type described where a vacuum booster was first energized to substantially its full force potential before energization of the hydraulic booster, and additional pump or special valving and control devices were necessary for operating the modulator at low brake force applications. In accordance with the present application, the hydraulic booster is energized first so that full hydraulic pressure is available to operate modulator 176 and the wheel lock control system at all times, including very low braking force applications.

The described arrangement whereby hydraulic pressure acts on valve sleeve G for biasing same to the right in FIG. 1 makes it possible to use a much smaller spring 108 than would otherwise be possible. When hydraulic booster B is energized, hydraulic pressured is acting tending to move valve sleeve G to the left in FIG. 1 away from flat end 126 of piston rod 128. The greater force acting on the larger oppositely facing areas of valve sleeve G within cavity 102 aids spring 108 in firmly holding seat 124 in engagement with shoulder 106 of sleeve 92. This arrangement enabling use of a much lighter and smaller spring considerably reduces the cost of the valving, and also saves considerable space.

Although the invention has been shown and described with respect to a preferred embodiment, it is obvious that equivalent alterations and modifications will occur to other skilled in the art upon the reading and understanding of this specification. The present invention includes all such equivalent alterations and modifications, and is limited only by the scope of the claims.

I claim:

1. A combined hydraulic and vacuum booster comprising; series connected hydraulic and vacuum boosters having valve means for operating same and including a common force output member, common operating means for operating said valve means and energizing said boosters in sequence for first applying substantially the full force of said hydraulic booster to said output member while said vacuum booster is substantially inoperative and then applying the force of said vacuum booster to said output member, said hydraulic booster including a piston and said valve means including a normally open hydraulic valve for bypassing hydraulic fluid from one side to the other of said piston, said operating means being operative to first close said hydraulic valve and then momentarily operate said valve means to energize said vacuum booster with substantially less than its full force potential so that said vacuum booster simply follows said hydraulic booster without supplying any significant force to said force output member until substantially the full force of said hydraulic booster is applied to said force output member whereupon said valve means is operated to energize said vacuum booster to substantially its full force potential.

2. A combined hydraulic and vacuum booster comprising; hydraulic and vacuum boosters coaxially mounted in series, hydraulic and vacuum booster valve means for energizing said hydraulic and vacuum boosters, operating means for first operating said hydraulic booster valve means to energize said hydraulic booster and subsequently operate said vacuum booster valve means momentarily to energize said vacuum booster with substantially less than its fully force potential so that said vacuum booster follows said hydraulic booster until said hydraulic booster is applying its full force potential whereupon said operating means operates said vacuum booster valve means to energize said vacuum booster to its full force potential.

3. The booster of claim 2 wherein said hydraulic booster includes a piston and said hydraulic booster valve means includes a sleeve member mounted in said piston for axial movement relative thereto and having a seat engageable by said operating means, and yieldable biasing means for normally biasing said sleeve member toward said operating means.

4. A combined hydraulic and vacuum booster comprising; hydraulic and vacuum boosters coaxially mounted in series, hydraulic and vacuum booster valve means for energizing said hydraulic and vacuum boosters, said boosters having a common force output member extending from said hydraulic booster, common operating means connected to said vacuum booster for operating both said hydraulic and vacuum booster valve means, said common operating means being operative for first operating said hydraulic booster valve means to energize said hydraulic booster to substantially its full force potential and then operating said vacuum booster valve means momentarily to energize said vacuum booster with substantially less than its full force potential when said hydraulic valve means is operated so that said vacuum booster follows said hydraulic booster until said hydraulic booster is applying its full force potential whereupon said operating means operates said vacuum booster valve means to energize said vacuum booster to its fully force potential.

5. A combined hydraulic and vacuum booster comprising; hydraulic and vacuum boosters coaxially mounted in series, hydraulic and vacuum booster valve means for energizing said hydraulic and vacuum boosters, operating means for first operating said hydraulic booster valve means to energize said hydraulic booster to its fully force potential and then operating said vacuum booster valve means to energize said vacuum booster to its full force potential, said operating means being operative when said hydraulic booster valve means is operated to momentarily operate said vacuum booster valve means for energizing said vacuum booster to substantially less than its full force potential so that said vacuum booster follows said hydraulic booster under its own power instead of being dragged along by said hydraulic booster.

* * * * *